March 5, 1963 C. B. NORDSTROM 3,080,448
CABLE SPREADER OR SEPARATOR
Filed Sept. 8, 1961
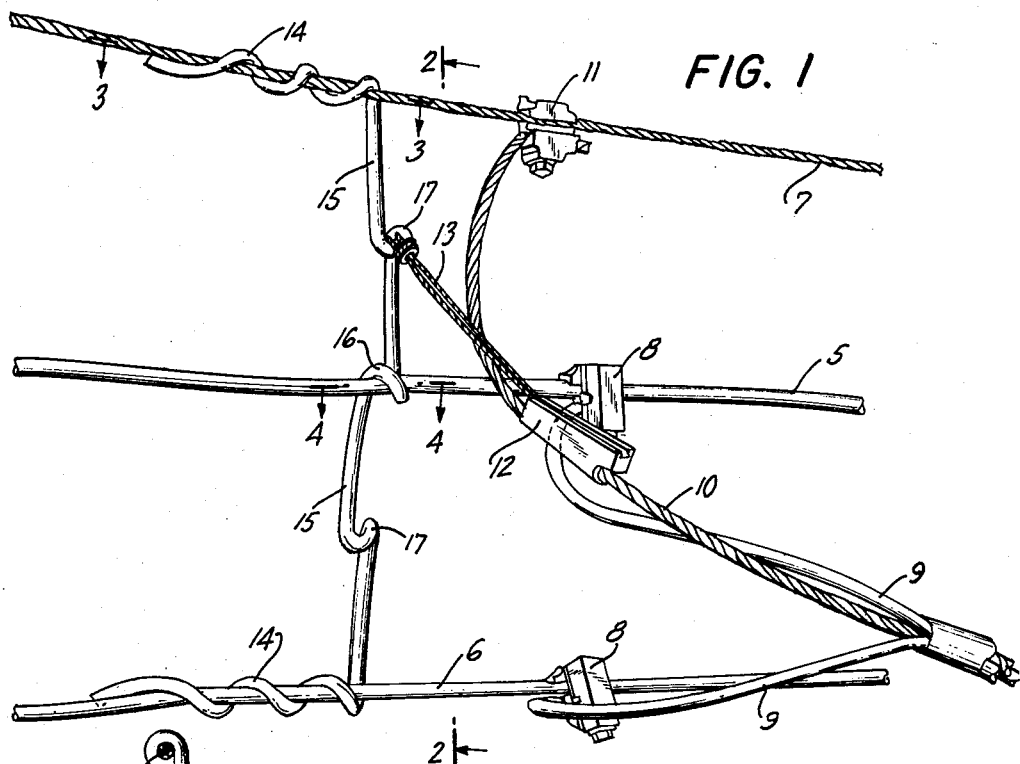
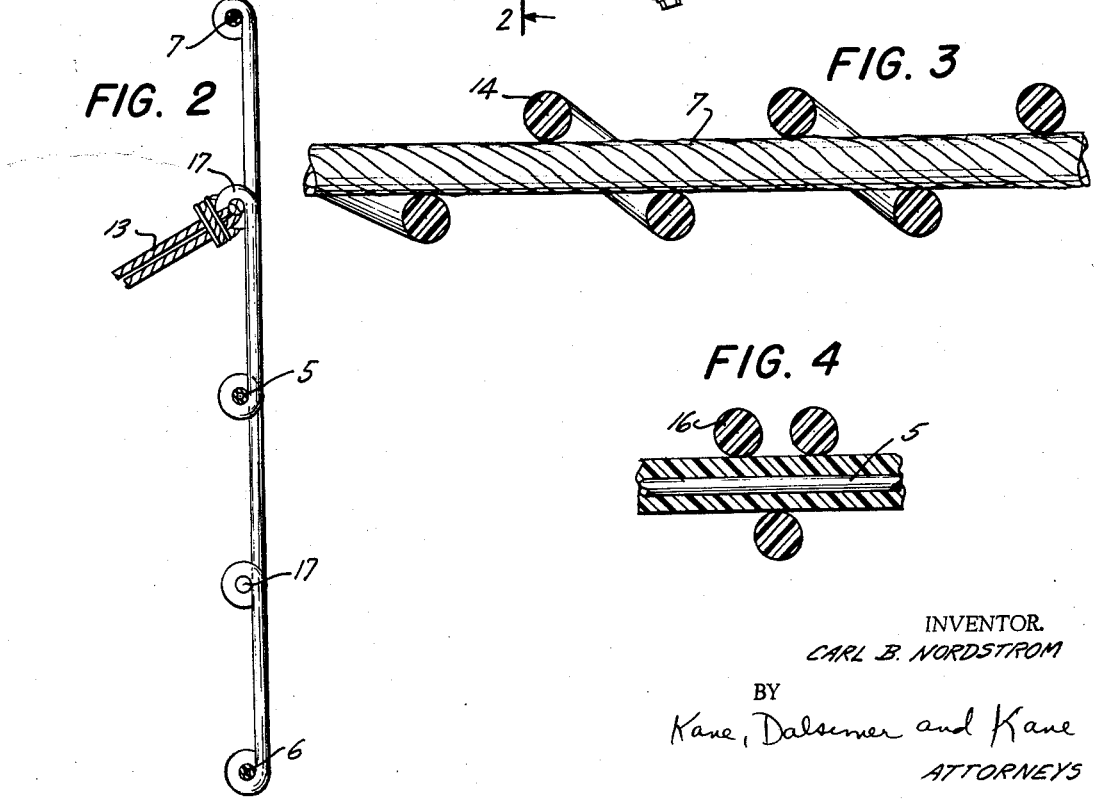
INVENTOR.
CARL B. NORDSTROM
BY
Kane, Dalsimer and Kane
ATTORNEYS United States Patent Office 3,080,448
Patented Mar. 5, 1963

3,080,448
CABLE SPREADER OR SEPARATOR
Carl B. Nordstrom, Poughkeepsie, N.Y., assignor to Fargo Mfg. Company, Inc., a corporation of New York
Filed Sept. 8, 1961, Ser. No. 136,771
5 Claims. (Cl. 174—146)

This invention relates to a functionally and structurally improved spreader for use with current transmission cables.

It is an object of the invention to provide a spreader of simple and economical design which may readily be applied to and removed from cables and which, when in position, will properly maintain those cables in spaced condition with respect to each other as well as with respect to a messenger cable which may be included in the transmission assembly.

A further object is that of providing a spreader which may be advantageously employed at points where a "tap-off" or a service coupling is to be provided; the spreader incorporating characteristics such that strains will be yieldingly resisted, either as a consequence of the cables tending to sway under wind conditions or the service coupling exerting strains in a direction laterally to the transmission cables.

With these and other objects in mind, reference is had to the attached sheet of drawings illustrating one practical embodiment of the invention and in which:

FIG. 1 is a perspective view of the spreader applied to transmission and messenger cables;

FIG. 2 is a sectional side view taken along the line 2—2 in the direction of arrows as indicated in FIG. 1; and FIGS. 3 and 4 are longitudinal sectional views in enlarged scale taken respectively along the lines 3—3 and 4—4 in the direction of the arrows as also indicated in FIG. 1.

Referring primarily to FIG. 1, transmission cables have been shown at 5 and 6. A messenger cable 7 has been illustrated as forming a part of this grouping. Clamps such as 8 are applied one to each of the cables 5 and 6. While various types of clamps are usable, they should be of the general character shown in the prior United States patents to Becker 2,469,542 of May 10, 1949, and Wengen et al. 2,858,522 of October 28, 1958.

Extending laterally from the transmission cables is a conductor assembly. This will conveniently include leads 9 and a messenger cable 10. The latter has its end connected with cable 7 by, for example, a clamp 11 corresponding to the clamps 8. The cable 10 will also preferably mount a dead end or anchoring unit 12 from which there extends a loop 13. This anchoring device should be of the type shown in the prior United States patent to Hampe 2,902,736 of September 8, 1959.

The spreader will comprise an elongated body formed of insulating material and of a generally rod-like configuration. While in the drawings a rod cylindrical in cross-section has been shown, it is apparent that various other configurations could be employed to advantage. The rod is formed of any suitable material such as a thermo plastic, fiber glass, etc. Its ends are defined by spiral coils 14, having an internal diameter such that they will properly engage the surfaces of the cables with which they are associated to retain the spreader against shifting along the cables. Extending inwardly from the inner ends of engaging portions 14 are arms 15 which have their inner ends connected to each other by a central loop 16. Thus a generally U-shaped spreader is furnished, the base of which comprises arms 15 and loop 16; the legs thereof being provided by the laterally extending coils 14.

In the illustrated embodiment, three cables 5–7 have been shown. Therefore, a corresponding number of cable engaging portions 14 and 16 have likewise been illustrated. It is apparent, however, that according to the needs of a given installation a corresponding number of engaging portions may be included in the spreader. The spreader, which is preformed to include the parts 14 and 16, will embody resiliency in that the rod material may be laterally stressed and will, under these circumstances, flex. By providing the central cable-receiving loop 16, the outer ends of the arms continued in the engaging portions 14 will be capable of limited swinging movements around the relatively fixed point defined by loop 16. This is especially desirable in that the spreader, under these circumstances, will yieldingly resist swaying movements of the cables with respect to each other under wind and similar conditions, although a certain amount of sway will be tolerated.

In the event tap-off connections are desired adjacent the spreader, then the arms 15 of the latter may be formed with loops 17 at points intermediate their ends and preferably midway between loop 16 and the engaging portions 14. In common with the latter, loops 17 will be preformed in the spreader and all loops will extend outwardly from one side of the spreader body. With the ends of leads 9 of the conductor assembly connected to clamps 8 and the latter electrically connected to cables 5 and 6, it is apparent that the dead end or anchoring device 12 may have its loop 13 or other suitable coupling connected to loop 17. In this manner, lateral strains, which would otherwise be imposed upon clamps 8 and cables 5 and 6, will be absorbed by the spreader. In common with the swinging of the arms with respect to loop 16, it is apparent that under such strains the portions of a given arm 15 to each side of loops 17 will swing with respect to each other to yieldingly resist strains imposed by the service connection. The extension of messenger cable 10 to the clamp 11 and messenger cable 7 provides an obvious safety factor.

It is apparent that a linesman will have no difficulty in applying this spreader. It will simply be necessary to flex arms 15 around loop 16 so that the latter will open and thus be capable of ready application to a cable such as 5. Likewise, the coils 14, when flexed, by moving their free ends, will open so that as those ends are rotated the convolutions of the coils will encircle and enclose cables 7 and 6 and properly engage therewith. If further cables are included in the assembly, then the loops 17 may be similarly engaged. Otherwise, these loops will be of great value when establishing a service connection as aforedescribed. Otherwise, they will simply form parts of the arms 15.

Thus, among others, the several objects of the invention as specifically aforenoted are achieved. Obviously, numerous changes in construction and rearrangement of the parts may be resorted to without departing from the spirit of the invention as defined by the claims.

What I claim is:

1. A cable spreader comprising a rod of resilient insulating material preformed to provide an outer pair of expandable cable engaging coils, arms connected at their outer ends with said coils and extending inwardly towards each other, a cable encircling loop connected to the inner ends of said arms, said spreader having a U-shape in which said arms and loop comprise the base and said coils provide the legs thereof, and the convolution providing said loop being expandable to receive a cable upon the outer arm ends being swung relative to each other in certain directions; the release of said outer arm ends resulting in said loop yieldingly constricting around the thus embraced cable.

2. In a spreader as defined in claim 1, and an anchoring means forming a part of said rod at a point intermediate the ends of one of said arms to connect with a conductor assembly extending laterally from said cables and resiliently supported therefrom.

3. In a spreader as defined in claim 2, said anchoring means comprising a loop furnishing a yielding point around which the parts of said one arm swing.

4. In a spreader as defined in claim 3, a further anchoring loop formed in the second of said arms also at a point intermediate its ends and all of said loops extending in a generally similar direction to one side of said spreader.

5. In a spreader as defined in claim 1, said preformed coils each comprising a plurality of convolutions terminating in an outer end swingable around a cable to cause yielding encirclement of the latter by said coils.

References Cited in the file of this patent

UNITED STATES PATENTS

| | | |
|---|---|---|
| 591,760 | Harden | Oct. 12, 1897 |
| 1,288,485 | Blackburn | Dec. 24, 1918 |
| 1,693,670 | Salesas | Dec. 4, 1928 |
| 2,263,728 | Gordon et al. | Nov. 25, 1941 |
| 2,959,632 | Peterson | Nov. 8, 1960 |
| 3,021,381 | Wengen | Feb. 13, 1962 |